United States Patent
Douma et al.

(10) Patent No.: US 9,857,541 B2
(45) Date of Patent: Jan. 2, 2018

(54) COMPONENT ALIGNMENT

(71) Applicant: FINISAR CORPORATION, Sunnyvale, CA (US)

(72) Inventors: Darin James Douma, Monrovia, CA (US); Frank J. Flens, Campbell, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/219,196

(22) Filed: Jul. 25, 2016

(65) Prior Publication Data

US 2017/0023749 A1 Jan. 26, 2017

Related U.S. Application Data

(60) Provisional application No. 62/195,877, filed on Jul. 23, 2015, provisional application No. 62/237,817, filed on Oct. 6, 2015.

(51) Int. Cl.
*G02B 6/42* (2006.01)

(52) U.S. Cl.
CPC .......... *G02B 6/4244* (2013.01); *G02B 6/423* (2013.01); *G02B 6/4204* (2013.01); *G02B 6/428* (2013.01); *G02B 6/4238* (2013.01); *G02B 6/4239* (2013.01); *G02B 6/4257* (2013.01); *G02B 6/4249* (2013.01)

(58) Field of Classification Search
USPC ..................................................... 385/14, 88
See application file for complete search history.

(56) References Cited

U.S. PATENT DOCUMENTS

| | | | |
|---|---|---|---|
| 6,234,687 B1 * | 5/2001 | Hall | G02B 6/423 385/88 |
| 6,344,148 B1 | 2/2002 | Park et al. | |
| 2002/0114586 A1 * | 8/2002 | Case | G02B 6/2553 385/88 |
| 2013/0210269 A1 * | 8/2013 | Neer | G02B 6/4246 439/487 |
| 2014/0321817 A1 | 10/2014 | Wang | |

FOREIGN PATENT DOCUMENTS

| | | |
|---|---|---|
| JP | 2000331764 A | 11/2000 |
| WO | 2013155263 A1 | 4/2013 |

OTHER PUBLICATIONS

International Search Report and Written Opinion, as issued in connection with International Patent Application No. PCT/US2016/043936, dated Oct. 10, 2016, 21 pgs.

* cited by examiner

*Primary Examiner* — Eric Wong
(74) *Attorney, Agent, or Firm* — Maschoff Brennan

(57) ABSTRACT

A system may include a substrate and a lens component. The substrate may include pads and solder protuberances. Each solder protuberance may be located on a pad. The lens component may define grooves sized to receive at least a portion of the solder protuberances. The lens component may be positioned relative to the substrate such that at least a portion of each solder protuberance is positioned within the grooves.

18 Claims, 8 Drawing Sheets

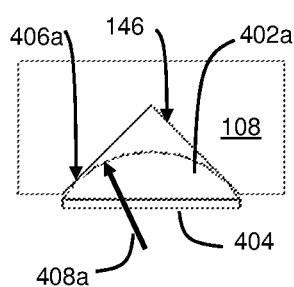 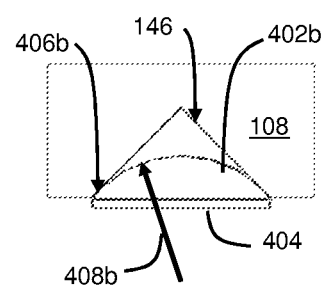 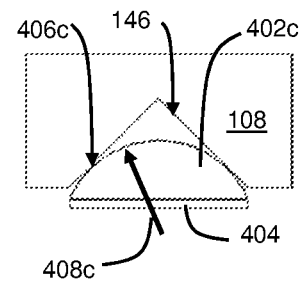
*Fig. 4A*   *Fig. 4B*   *Fig. 4C*
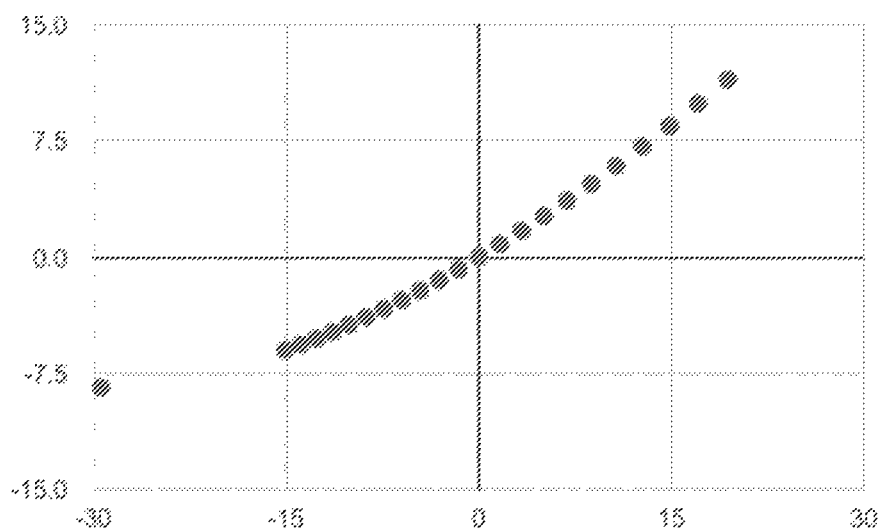
*Fig. 5A*

COMPONENT ALIGNMENT

CROSS-REFERENCE TO RELATED APPLICATIONS

This application claims the benefit of U.S. Provisional Patent Application No. 62/195,877, filed Jul. 23, 2015, titled "COMPONENT ALIGNMENT," and U.S. Provisional Patent Application No. 62/237,817, filed Oct. 6, 2015, titled "COMPONENT ALIGNMENT," both of which are incorporated herein by reference in their entireties.

BACKGROUND

Precisely positioning components of conventional optoelectronic devices relative to one another may be difficult. Particularly when doing so with tolerances in a low single-digit micrometers (also microns or µm) range, at low cost, and at high speed, such as in a volume production environment. By way of example, high speed lasers and photo detectors employed in optoelectronic devices may have small optical apertures, potentially on the order of tens of microns. Alternately or additionally, high bandwidth optical fiber may include comparable optical apertures. Furthermore, lenses and mirrors used to guide light from a light emitting aperture to a light receiving aperture are encouraged to be located within a few microns of a defined position to facilitate correct operation.

However, due to the disparate materials and fabrication processes used for lasers, detectors, lenses, optical fiber, and/or other optoelectronic device components, some or all of the components may be manufactured separately, to be precisely aligned later during subsystem assembly. One conventional method for aligning the components may include active alignment. In active alignment techniques, a precision robotic manipulator may position one component with respect to another component while monitoring signal strength, imaging feedback, or the like. Once an acceptable positioning arrangement has been found, the positions of the components may be fixed. Active alignment and similar processes may be relatively slow and may require relatively expensive equipment, which may encourage high alignment costs.

The claimed subject matter is not limited to embodiments that solve any disadvantages or that operate only in environments such as those described above. This background is only provided to illustrate examples of where the present disclosure may be utilized.

SUMMARY

In one non-limiting embodiment, a system may include a substrate and a lens component. The substrate may include pads and solder protuberances. Each solder protuberance may be located on a pad. The lens component may define grooves sized to receive at least a portion of the solder protuberances. The lens component may be positioned relative to the substrate such that at least a portion of each solder protuberance is positioned within the grooves.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

FIGS. 4A-4C illustrate example configurations of a groove and solder protuberance.

FIGS. 5A-5C illustrate example height process sensitivities.

DETAILED DESCRIPTION

Figure 1A:
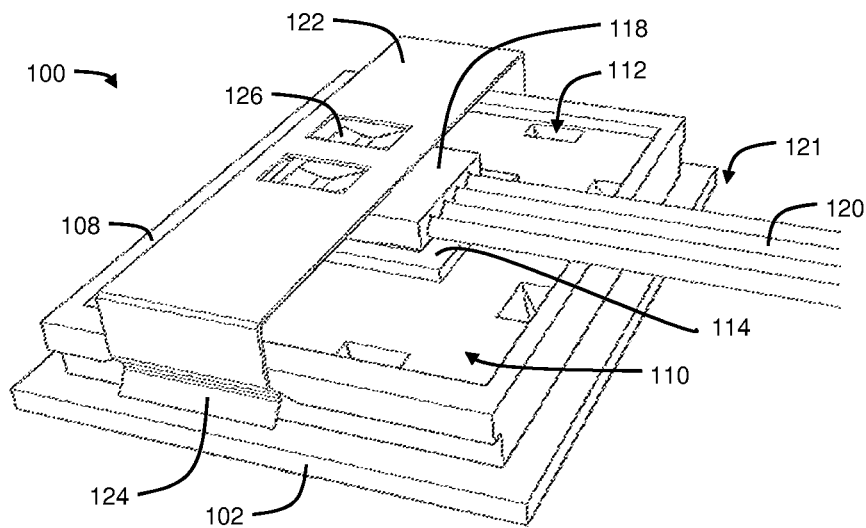
FIGS. 1A-1E illustrate various views of an example optoelectronic transceiver.

Passive alignment of optoelectronic components may be similar, conceptually, to fitting the components together like very precise puzzle pieces, may be desirable. Passive alignment may be relatively inexpensive, particularly compared to active alignment. However, limitations on physical accuracy in low cost materials such as plastic and glass have discouraged fabrication of lenses, circuit boards, and low cost mechanical assemblies with the intrinsic accuracy sought for high speed optoelectronic devices.

Embodiments described herein may facilitate high precision alignment of optoelectronic and optical elements without the need for robotic positioning systems or closed loop feedback. Advantageously, embodiments may facilitate the use of relatively accurate low cost processes, such as lithographic metal patterning, plastic molding, and the like with relatively less accurate processes while employing component geometry to reduce errors introduced by the less accurate processes. Thus, for example, the final position of the components may be determined by the intrinsic accuracy of the most accurate processes. In some embodiments, lens components may be aligned. Other components may alternately or additionally be aligned as described herein.

By way of example, a surface with lithographically patterned metal, such as a printed circuit board (PCB), may undergo conventional die attach processes, which may align optoelectronic devices to the metal pattern with high accuracy at relatively low costs and at relatively high speeds. The metal pattern of the PCB may also be used to form solder protuberances, also described herein as bumps or solder bumps. For example, solder protuberances may be formed using the processes described herein. Alternately or additionally, a precision molded plastic component may include optical surfaces and protuberance-alignment features, such as grooves. The molded plastic component may be roughly positioned over the solder protuberance pattern of the PCB and allowed to settle into place under its own weight.

In some embodiments, the plastic component may include a microfluidic gallery through which epoxy may be introduced. The microfluidic gallery may supply the epoxy to the protuberance-alignment features and onto the solder protuberances. Curing the epoxy may position the plastic component relative to the PCB with high accuracy. Thus, for example, optical surfaces of the plastic component may be precisely and accurately aligned with optical apertures of optoelectronic devices attached to the PCB.

In some embodiments, the alignments of each of the components may be both low cost and high accuracy, which may facilitate an assembly process that is both low cost and high accuracy. For example, the alignment of a die to a metal pad pattern, the metal pad pattern to a solder protuberance center, the solder protuberance center to a plastic component alignment feature, and the plastic component alignment feature to a plastic component optical surface may all be both low cost and high accuracy.

Thus, in some embodiments, formed protuberances may be used to position components on a surface. For example, a lithographically formed metal pattern on a surface may enable metal pads whose center locations are very precise, even when metal growth (for additive processes) or metal removal (for subtractive processes) may be less precisely controlled. Errors in metal addition or removal may primarily affect metal pattern thickness and pad area but may have little or no effect on the center locations of the pads. The surface tension of liquid solder and its strong adhesion to metal surfaces in the liquid phase may allow the shape of a solder ball and the center of the surface of the solder ball to be tightly controlled, as dominant fabrication errors may cancel out. The combination of metal pattern pad center accuracy and liquid surface tension protuberance surface definition may allow for very tightly controlled protuberance surface centering. A symmetric mating surface with two contact points on opposite sides of the resulting protuberance may passively self-center with high accuracy.

Alternately or additionally, a V-groove and a solder protuberance may be used to position a component on a surface. In some embodiments, an inverted V-groove placed over a spherical cap-shaped protuberance may contact at two points, the midpoint of which may be tightly determined for both a precisely fabricated V groove and for a solder protuberance whose shape is determined by metal surface tension during liquid phase. Since the midpoint may be tightly controlled for both the V-groove and for the solder protuberance, they may be used together to precisely position a component on a surface along a single dimension. Multiple protuberances placed in pattern on the surface may be used to control positioning of the component in two dimensions.

Alternately or additionally, a V-groove and a sub-hemispherical protuberance may be used to reduce a height of an object. In some embodiments, use of a V-groove and a sub-hemispherical protuberance to position an object on a surface may improve control of the height of object above the surface, particularly if a major error contribution is from variation in the volume of the protuberance. Protuberances formed via solder paste screening onto a surface with metal pads may be well aligned to the center of their respective metal pad but their volume may be less well controlled due to variation in screen thickness, screen aperture opening, squeegee pressure and angle, solder paste consistency, and other factors. Two factors of this approach may reduce the impact of common fabrication errors.

The first factor of error reduction may arise where fabrication errors for both the stencil and the metal pattern are linear errors in solder paste stencil aperture size and printed circuit board pad diameter. When these errors are added onto an aperture of sufficient size and a pad of sufficient size, the percentage change in the solder volume and pad area may be reduced.

The second factor of error reduction may come from component shaping where variations in solder volume may be somewhat compensated by the geometric interaction between the surface of the protuberance and the V-groove. For a sub-hemispherical protuberance interacting with a constant angle V-groove, it may be that as solder volume increases slightly, the height of the protuberance increases; however, the protuberance's surface curvature, and thus its radius, may decrease. This increase in volume and related decrease in radius may cause the protuberance to V-groove contact points to migrate deeper into the V-groove and thus cancel a portion of the height change of the protuberance, which may lead to a relatively smaller change in the height of the V-groove above the plane of the substrate, PCB, or other surface.

Alternately or additionally, epoxy wells and a distribution gallery may be used for tight control of an epoxy application. For very small components which are glued to a surface, applying an epoxy bead around the base of the component may be difficult due to limitations in how small an applicator needle can be used and how precisely it can be positioned. Additionally, limitations on how small a drop can be formed may interfere with clean and precise placement of the epoxy. For very small components on the order of a few mm in size, a single well on the top of the component may be connected to a gallery of channels connecting the groove around the base of the component with the well. By placing a single point application of epoxy into the relatively large and easy to access well, a controlled and precise application of epoxy around the entire base of the component may be achieved. Capillary forces may be employed to pull epoxy through the gallery. Surface tension of the epoxy in the groove may be used to generate downforce on the component, encouraging a tight conformation of the component to the surface. Internal liquid pressure in the epoxy gallery may be determined by the height of the well above the gallery. By controlling this liquid column height pressure, the tendency of the component to 'float' on top of the epoxy may be balanced against the downforce generated by the surface adhesion of the liquid epoxy.

Alternately or additionally, epoxy liquid phase adhesion and cohesion forces may be used to position a component. Conventionally, for very small components being glued to a surface, it may be necessary to apply a downward force on the component during epoxy curing to control the space beneath the component and to ensure a tight fit. Creating tooling to apply an external load to a very small component may be difficult to do well, and may add cost and complexity to the epoxy application and curing process. Conversely, in some embodiments, a system may employ the surface adhesion properties of uncured epoxy to generate a controlled downforce on the component prior to epoxy cure without the need for external load-application tooling or systems.

Reference will now be made to the figures wherein like structures will be provided with like reference designations. The drawings are non-limiting, diagrammatic, and schematic representations of example embodiments, and are not necessarily drawn to scale.

Figure 1B:
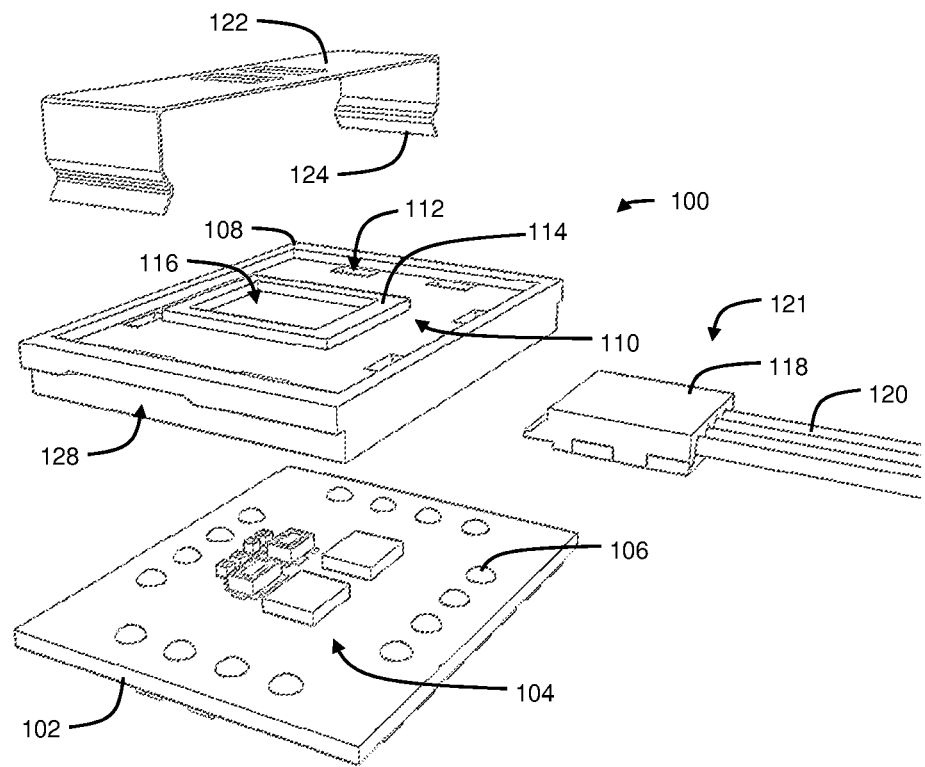
Figure 1C:
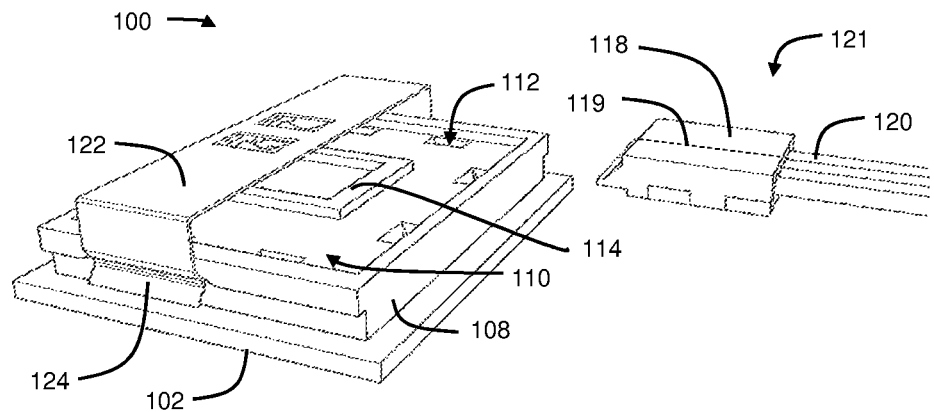
Figure 1D:
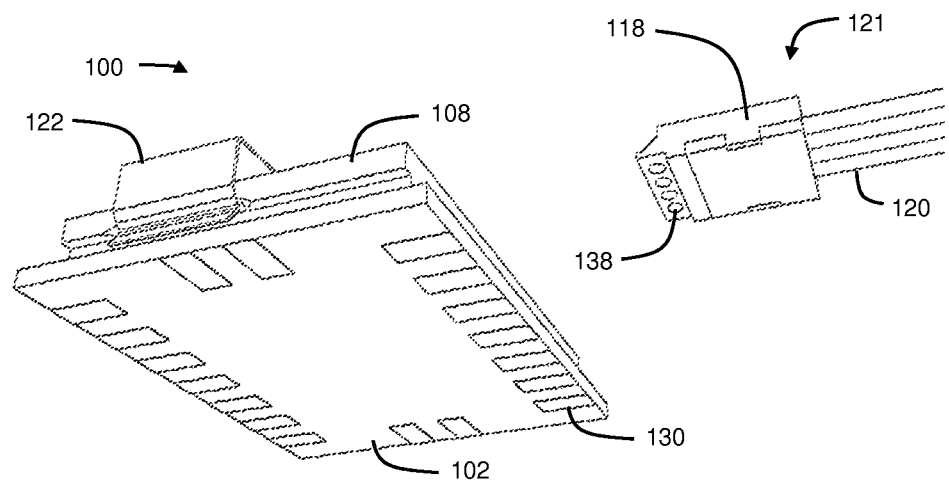

FIG. 1A illustrates a perspective view of an example optoelectronic transceiver 100. FIG. 1B illustrates a perspective exploded view of the transceiver 100. FIG. 1C illustrates a top perspective partially exploded view of the transceiver 100. FIG. 1D illustrates a bottom perspective partially exploded view of the transceiver 100.

The transceiver 100 may include a substrate 102. The substrate 102 may include a lithographically formed PCB. The substrate 102 may include solder pads 130 (shown in FIG. 1D). In some embodiments, the solder pads 130 may be analogous to those of a quad flat no-leads (QFN) package.

Alternately or additionally, solder pads analogous to those of other surface-mount packaging types may be used. For example, solder pads analogous to those of a quad flat package (QFP) or a ball grid array (BGA) package may be used. Thus, for example, the transceiver 100 may be placed on and soldered to a host board. The transceiver 100 may be a highly reflowable or fully reflowable optics transceiver and may be positioned on a PCB via a reflow soldering process. Reflow capabilities may allow the transceiver 100 to be placed at the same time as other surface mount components during system manufacturing. Thus, for example, manufacturing costs may be reduced and/or assembly operation may be streamlined.

The substrate may include multiple protuberances 106 or bumps. In some embodiments, the protuberances 106 may be silkscreened, reflowed solder on pads formed on the substrate 102. The positions of the pads, and by extension, the protuberances 106 may be accurately and precisely set by a photo etching process. Alternately or additionally, the protuberance shape may be controlled by photo etching of a silkscreen pattern and a silkscreen process control.

In some embodiments, the pads may include round copper pads having a 500 micrometer (also micron or μm) diameter. Alternately, the pads may include other materials, such as other metals. Alternately or additionally, the pads may have different sizes.

In some embodiments, to form the solder protuberances 106, the pads may be covered in a solder paste. For example, the pads may be covered in a disk of solder paste 100 microns thick and 452 microns in diameter. The disk of solder paste may be applied to the pads via a silkscreen application. the disk of solder paste may be soldered via a reflow process to form a solder protuberance 106 with a spherical cap shape having a nominal radius of 300 microns. The shape of the solder protuberance 106 may be governed by surface tension effects of the solder while in liquid form during the soldering process.

The substrate 102 may include integrated circuits (ICs) 104 located on the substrate 102. The ICs 104 may include optoelectronic components, such as lasers, photodiodes, signal processing ICs, and the like. In some embodiments, the ICs 104 may include a PIN photodiode and/or a vertical-cavity surface-emitting laser (VCSEL).

In some embodiments, the transceiver 100 may accommodate four optical fibers 120. Alternately, the transceiver 100 may accommodate more or fewer optical fibers 120. In some embodiments, the transceiver may accommodate conductive lines, such as copper lines, in addition to the optical fibers 120. One end of the optical fibers 120 may be attached to the cable lens component 118. In some embodiments, the other end of the optical fibers 120 may be attached to another cable lens component analogous to the cable lens component 118. The optical fibers 120 and the cable lens component 118 may be described herein as a cable 121. FIGS. 1C and 1D illustrate the transceiver 100 with the cable 121 disconnected from the rest of the transceiver 100.

The transceiver 100 may include a lens clip 122. The lens clip 122 may include arms 124 sized and shaped to locate the lens clip 122 on a lens component 108. The lens component 108 may be described herein as a transceiver lens component 108 to distinguish from the cable lens component 118. For example, the arms 124 may elastically deform to allow the lens clip 122 to be located on the lens component 108. In some embodiments, the lens component 108 may include recesses 128 configured to encourage the lens clip 122 to attach to the lens component 108 in a desired location. In some embodiments, the lens clip 122 may be selectively removed from the transceiver 100. The selectively removable lens clip 122 may accommodate assembly of the transceiver 100. For example, the selectively removable lens clip 122 may accommodate assembly by a manufacturer incorporating the transceiver 100 into a device by hand and/or without the use of particularly specialized manufacturing equipment. Alternately or additionally, the selectively removable lens clip 122 may accommodate cleaning of the optical surfaces of the lens component 108, such as the optical surface 116. By way of example, the optical surfaces may be cleaned following assembly of the lens component 108 to a PCB, following assembly of the lens component 108 into a device, following or prior to other assembly steps, or the like or any combination thereof.

When the cable 121 is connected to the transceiver 100, e.g., when the cable lens component 118 is located on the lens component 108 at the optical surface 116, the lens clip 122 may urge the cable lens component 118 against the lens component 108. For example, the lens clip 122 may include one or more fingers 126 that may be configured to elastically bias against the cable lens component 118 in a manner analogous to a cantilever spring.

In some embodiments, the lens clip 122 and the lens component 108 may be configured to permit selective removal of the cable lens component 118. For example, cable lens component 118 may be removed to allow for replacement of the cable 121, for replacement of the remainder of one or both transceivers 100, for assembly of larger devices including the transceiver 100, for separate transportation, for testing, or the like or any combination thereof.

A protrusion 114 may further encourage the cable lens component 118 to stay in place relative to the lens component 108. The lens component 108 and the cable lens component 118 may form a relatively tight fit and may protect an optical surface 116 (shown in FIG. 1B) from dust and damage. For example, the optical surface 116 within the protrusion 114 may be protected from contact damage, such as scratches or the like. Alternately or additionally, the optical surface 116 within the protrusion may be highly cleanable to ensure a clean, optically transparent surface. In some embodiments, the optical surface 116 may be relatively flat and may be wiped clean with common cleaning implements such as cotton swabs, cotton balls, and/or the like.

As indicated in the figure, the cable lens component 118 may be relatively small. In some embodiments, the cable lens component 118 may be approximately 1.9 mm wide, approximately 2 mm long, and approximately 700 microns tall. Thus, for example, the cable 121 may be thread through relatively small openings and/or pathways before connecting the cable 121 to the transceiver 100. By way of example, the cable lens component 118, and thus the cable 121, may be threaded through a hinge, a backplane chassis, a PCB, or the like or any combination thereof.

In some embodiments, the cable lens component 118 may be separated into two or more portions. For example, the cable lens component 118 may be separated into two or more portions to accommodate passing the cable through relatively smaller openings. For instance, the cable lens component 118 may be separable along the dashed line 119 (shown in FIG. 1C). In a manner, the cable 121 may be assembled from multiple, smaller cables that may be thread through relatively smaller openings.

In some embodiments, one or more of the optical fibers 120 of the cable 121 may be attached to the lens component 108. For example, the optical fibers 120 of the cable 121 may be attached to the lens component 108 for strain relief, for discouraging the cable 121 from pulling the cable lens component 118 from its operating position if the cable 121 is moved, for positioning the cable 121, or the like or any combination thereof. In some embodiments, the cable 121 may be adhered to the lens component 108 via an assembly adhesive, double-sided foam tape, or the like.

In some embodiments, the transceiver 100 may be approximately 8 mm wide, approximately 6.5 mm long, and approximately 2 mm tall. Alternately, the transceiver 100 may have other dimensions. The transceiver 100 may be employed in a variety of applications, such as in products where maintaining a relatively small size may be desirable. For example, two transceivers corresponding to the transceiver 100, placed on two different host boards may allow a board-to-board communication connection between the two host boards when the transceivers are connected via the cable 121. The relatively small size of the cable lens component 118 and the cable 121 generally may allow the transceiver to be used in relatively small devices and/or in devices with relatively small openings and/or clearances through which a cable may pass. For example, the transceiver 100 may be employed in ultralight laptops or the like to provide a communication connection between a host board in a base of the laptop and a display board in a screen attached to the base of the laptop via one or more small hinges or other connections allowing portions of the laptop to move relative to one another.

In some embodiments, the transceiver 100 may provide a solution for system de-aggregation. For example, conventionally, in devices employing high speed interfaces, it may be desirable to position various components (e.g., a processor, an application-specific integrated circuit (ASIC), a memory radio, a display, an input/output (IO) interface, and/or the like) in close proximity to reduce noise, cross talk, power loss, and/or signal loss in a host substrate. This may complicate the design of the device and may limit a user's experience with the device. The transceiver may accommodate placing the various components relatively remote from one another, which may allow the device to be designed to improve a user's experience with the device. For example, the transceiver 100 may accommodate positioning memory remote from the processor to facilitate expansion and/or shared use of multiple processors.

Alternately or additionally, the transceiver 100 may be employed in other computers, such as servers, tablet computers, mobile phones, cameras, or the like. Alternately or additionally, the transceiver 100 may be employed in computer peripherals, such as modems, routers, and the like. Alternately or additionally, the transceiver 100 may be employed in televisions, such as flat panel televisions or the like. Alternately or additionally, the transceiver 100 may be employed in applications for reducing electromagnetic interference (EMI), such as in automobile cameras, including so-called backup cameras, and the like. Alternately or additionally, the transceiver 100 may be employed in active optical cables (ADCs), such as datacenter AOCs and/or consumer AOCs. Datacenter AOCs may include AOCs employed inside a server chassis, or the like. Consumer AOCs may include communication cables such as an optical universal serial bus (USB) cable, optionally with a Type-C connector, a Thunderbolt cable, optionally with a Thunderbolt 3 connector, and/or other communication cables.

Figure 1E:
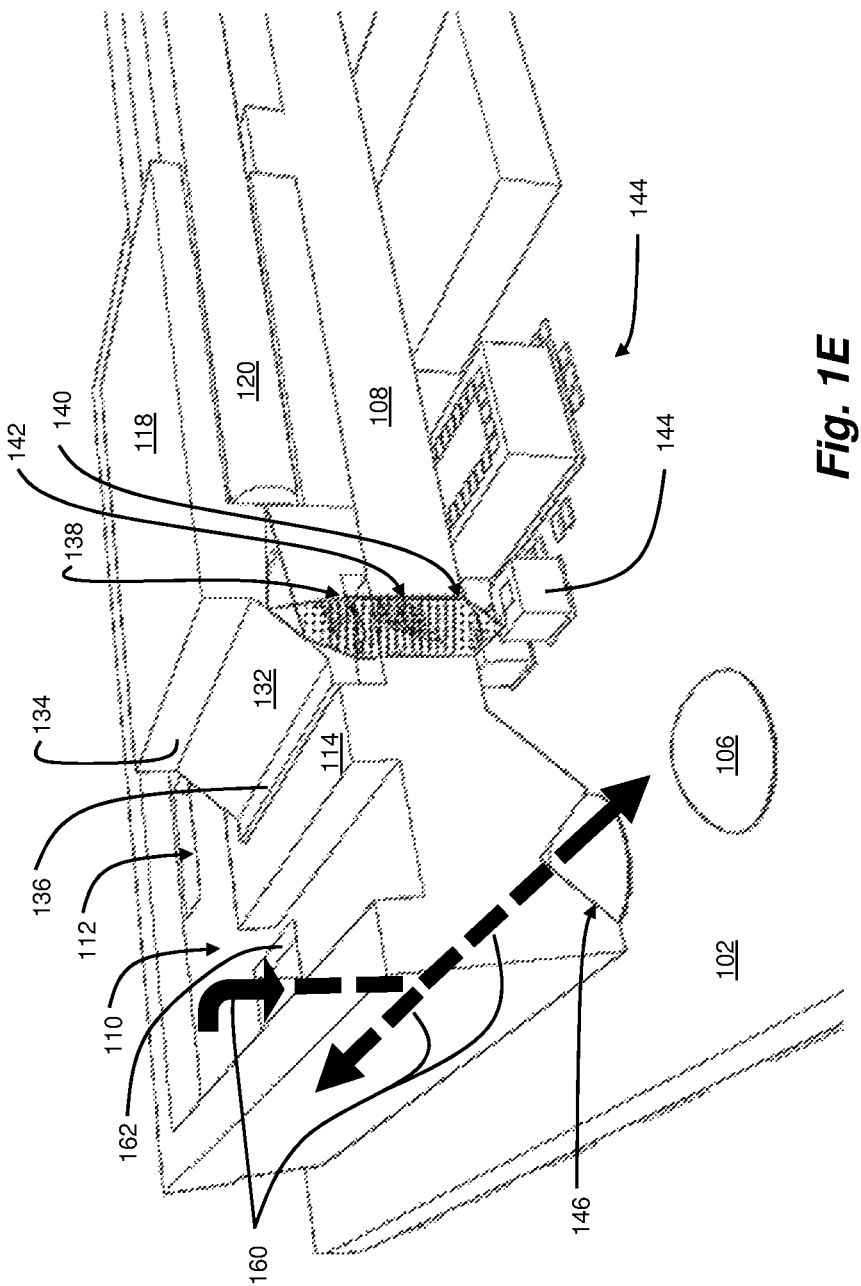

FIG. 1E illustrates a cutaway perspective view of the transceiver 100 of FIGS. 1A-1D. In particular, the lens component 108 and the cable lens component 118 are cutaway to the first of the optical fibers 120. Furthermore, the lens clip 122 has been omitted for clarity.

As may best be seen in FIG. 1E, the cable lens component 118 may include a total internal reflection (tir) mirror 132. The tir mirror 132 may be configured to reflect light approximately 90 degrees from the optical fibers 120 to a photodiode, such as a PIN photodiode, and/or light from a light source, such as a VCSEL, to the optical fibers 120. The photodiode and/or the light source may be generally represented by the optoelectronic component 144.

The cable lens component 118 may include shelf structures adjacent to the tir mirror 132. The shelf structures may include a shelf 134 and a shelf 136. The shelf structure may protect the tir mirror 132 and may allow the tir mirror 132 to be cleaned before and/or after assembly of the cable lens component 118 to the lens component 108. The tir mirror 132 may be wiped clean by common cleaning implements, such as cotton swabs, cotton balls, or the like. In some embodiments, the tir mirror 132 may be the only exposed optical surface when the lens component 108 and the cable lens component 118 are in place. In some embodiments, the lens clip 122 may protect the tir mirror 132 from contact, dust, and/or debris.

In some embodiments, the cable lens component 118 may include a collimating lens 138. Alternately or additionally, the lens component 108 may include a collimating lens 140. Thus, for example, an interface of the lens component 108 and the cable lens component 118 may include a collimated beam 142.

Alternately, the cable lens component 118 and the lens component 108 may include non-collimating lenses in place of the collimating lens 138 and the collimating lens 140 at the cable lens component 118 to lens component 108 interface. Such non-collimating lenses may be employed where eye safety of the beam from a bare transceiver is a concern, as a non-collimated beam may diverge as the distance from a laser increases, potentially improving eye safety.

Arrows 160 illustrate one example epoxy flow path. In some embodiments, liquid epoxy may be placed in the epoxy well 110. For example, the liquid epoxy may be placed in the epoxy well 110 using a needle applicator. Drain holes 112 may provide a path for epoxy to flow to the grooves 146 and may allow displaced air to leave. The epoxy may fill the grooves 146 and cover the solder protuberances 106. In some embodiments, the epoxy is pulled through the drain holes 112 and grooves 146 through a combination of gravity and capillary forces. In some embodiments, the liquid adhesion force of the epoxy may keep the epoxy from leaking out from the gap 148 (shown in FIG. 3) between the lens component 108 and the substrate 102. Alternately or additionally, surface tension of the epoxy may force the lens component 108 against the solder protuberances 106 of the substrate 102. Alternately or additionally, epoxy shrinkage during curing may encourage coherence of the lens component 108 and the substrate 102.

As shown in FIG. 1E, the drain holes 112 may include at least one rounded edge 162, which may encourage the epoxy to flow into the drain hole 112. Alternately or additionally, the elevation of the drain holes 112 may encourage control of a pressure of the epoxy.

In some embodiments, the lens component 108 alignment of the lens 140 to the optoelectronic component 144 may be subject to a 10 micron or smaller tolerance. Alternately or additionally, the cable lens component 118 alignment of the lens 138 to the fiber may be subject to a 10 micron or smaller tolerance. The lens component 108 to cable lens component 118 interface may include a collimated beam having approximately a 200 micron diameter. The lens component 108 to cable lens component 118 interface may be subject to a more than 50 micron tolerance. In some embodiments, a collimated interface may allow for reduced tolerances for the lens component 108 to the cable lens component 118 mechanical interface. Alternately or additionally, the collimated interface may encourage the transceiver 100 to be more tolerant to contamination, lens defects, and/or lens misalignment.

Figure 2:
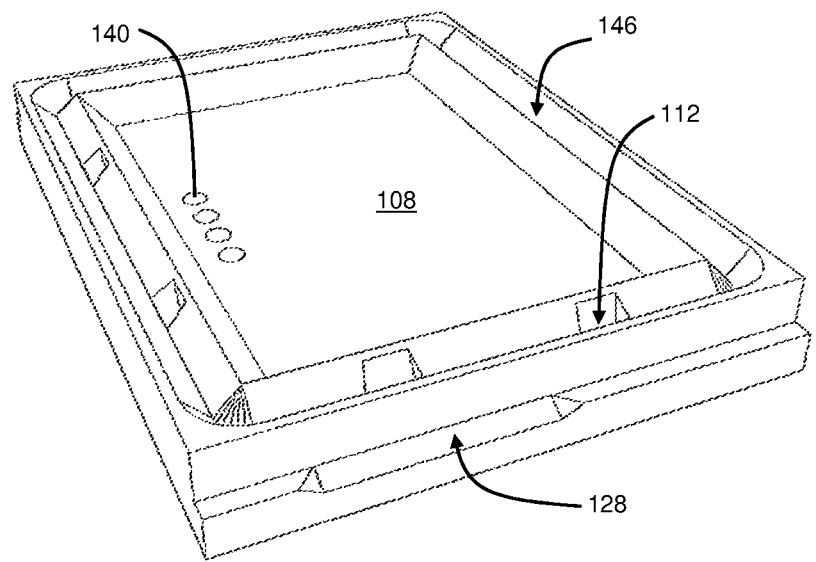
FIG. 2 illustrates a bottom perspective view of an example lens component.

FIG. 2 illustrates a bottom perspective view of the lens component 108 of FIGS. 1A-1E. The lens component 108 may include molded plastic, the manufacture of which may be relatively low cost and relatively high accuracy. The lens component 108 may include a groove 146. The groove 146 may include an angular groove. For example, the groove 146 may form a V-shaped cross-section. The groove 146 may be a high-precision molded feature of the lens component 108. In some embodiments, the groove 146 may have approximately a 90-degree shape. In some embodiments, the approximately 90-degree shape of the groove 146 may simplify the manufacturing of the lens component 108. The groove 146 may facilitate alignment of the lens component 108 with the substrate 102 of the transceiver 100.

Figure 3:
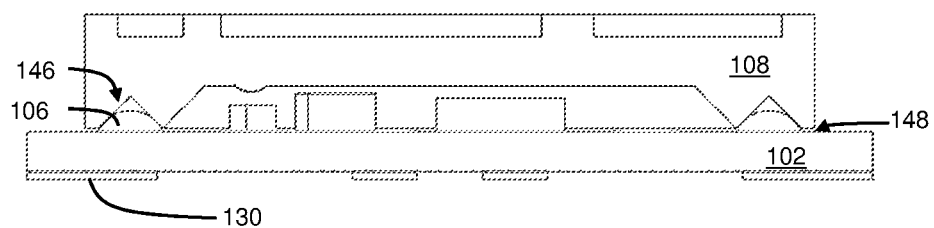
FIG. 3 illustrates a cutaway side view of an example lens component and substrate.

FIG. 3 illustrates a cutaway side view of the lens component 108 and the substrate 102 of FIGS. 1A-1E. The groove 146 of the lens component 108 may fit tightly and precisely to the solder protuberances 106 of the substrate 102. Furthermore, the configuration of the groove 146 and the solder protuberances 106 may create a close fit. In some embodiments, the configuration of the groove 146 and the solder protuberances 106 may create a small gap 148 between the lens component 108 and the substrate 102. The gap 148 may be filled with an epoxy for a tight and strong airtight seal. In some embodiments, the epoxy may form a seal around the base of 108 that may protect against contamination. For example, the epoxy seal may protect against contamination during washing after a reflow soldering process, during use, during cleaning for assembly, during cleaning for repairs, or the like.

In some embodiments, the substrate 102 and lens component 108 may be assembled via panel assembly. For example, an array of multiple lens components corresponding to the lens component 108 may be placed on an array of multiple substrates corresponding to the substrate 102 in one step. In some embodiments, manufacturing at the panel level may allow for efficiency advantages in manufacturing, such as testing advantages and the like. In some embodiments, the alignment features described herein may facilitate rapid assembly with common tools. For example, lens components 108 may be placed with pick-and-place machines, or by hand. Alternately or additionally, epoxy may applied to all of the epoxy wells 110 of the lens components 108 on a panel in a single pass. Alternately or additionally, epoxy for all of the transceivers 100 on a panel may be simultaneously ultraviolet (UV) cured and/or heat cured. The transceivers 100 may be assembled without high-precision placement operations and small batches may optionally be built by hand without the use of automation.

FIG. 4A illustrates an example configuration of a groove 146 and a target sized, or nominally sized, solder protuberance 402a. FIG. 4B illustrates an example configuration of a groove 146 and a solder protuberance 402b sized smaller than the target size solder protuberance 402a of FIG. 4A. FIG. 4C illustrates a groove 146 and a solder protuberance 402c sized larger than the target size solder protuberance 402a of FIG. 4A. The solder protuberance 402a, the solder protuberance 402b, and the solder protuberance 402c (collectively "solder protuberances 402") may correspond generally to the solder protuberances 106 of FIGS. 1A-1E and 3. In some embodiments, the size and the volume of the solder protuberances 106 may be designed to increase tolerances for solder volume and a pad 404 diameter. An x-dimension and/or a y-dimension (e.g., directions approximately parallel to the plane of the substrate 102) positional accuracy of the pads 404, and thus the solder protuberances 106, may be associated with a tolerance of an etch mask. The tolerance of the etch mask may be on the order of approximately 1 micron. Alternately or additionally, a z-dimension (e.g., a direction approximately normal to the plane of the substrate 102) tolerance may be associated with a tolerance of the solder and/or pad control. The tolerance of the solder and/or the pad control may be on the order of approximately 5 microns.

FIG. 4A shows a target protuberance radius 408a of the solder protuberance 402a and a target contact height 406a between the solder protuberance 402a and the groove 146 of the lens component 108.

As shown in FIG. 4B, a solder volume decrease of the solder protuberance 402b (e.g., relative to the solder volume of the target solder protuberance 402a of FIG. 4A) may lower the solder protuberance 402b height, but may increase the protuberance radius 408b. As the protuberance radius 408b increases, the contact height 406b between the solder protuberance 402b and the groove 146 of the lens component 108 decreases. Thus, for example, the two effects may cancel somewhat and may result in a relatively reduced change in the position of the lens component 108 in the z-dimension when the solder volume is below the target solder volume.

As shown in FIG. 4C, a solder volume increase of the solder protuberance 402c (e.g., relative to the solder volume of the target solder protuberance 402a of FIG. 4A) may raise the solder protuberance 402c height, but may decrease the protuberance radius 408c. As the protuberance radius 408b decreases, the contact height 406b between the solder protuberance 402b and the groove 146 of the lens component 108 increases. Thus, for example, the two effects may cancel somewhat and may result in a relatively reduced change in the position of the lens component 108 in the z-dimension when the solder volume is above the target solder volume.

The following equation may describe a calculation to determine a solder protuberance 106 radius, which may be represented by r.

$$r = \frac{\pi p^4}{12v} + \frac{1}{12\sqrt[3]{\pi}\,v}(\pi^4 p^{12} + 72\pi^2 p^6 v^2 +$$

$$12\sqrt{\pi^6 p^{18} v^2 + 45\pi^4 p^{12} v^4 + 648\pi^2 p^6 v^6 + 2916 v^8} + 648 v^4)^{\frac{1}{3}} +$$

$$\frac{\pi^{\frac{7}{3}} p^8}{12v(\pi^4 p^{12} + 72\pi^2 p^6 v^2 +}$$

$$12\sqrt{\pi^6 p^{18} v^2 + 45\pi^4 p^{12} v^4 + 648\pi^2 p^6 v^6 + 2916 v^8} + 648 v^4)^{\frac{1}{3}}$$

Where p may represent a radius of the pad on which the solder protuberance 106 is formed, such as the pad 404 of FIGS. 4A-4C, and v may represent the volume of the solder used to form the solder protuberance 106.

Furthermore, the following equation may describe a reference height of the lens component 108, which may be represented by z.

$$z = \sqrt{2}r - \sqrt{r^2 - p^2}$$

Where r may represent to the radius of the solder protuberance 106, and p may represent the radius of the pad on which the solder protuberance 106 is formed. The reference height z may correspond to a height of a nominal apex of the groove 146 relative to a nominal surface of the substrate, which may be indicated on FIG. 4A by reference 410.

Figure 5B:
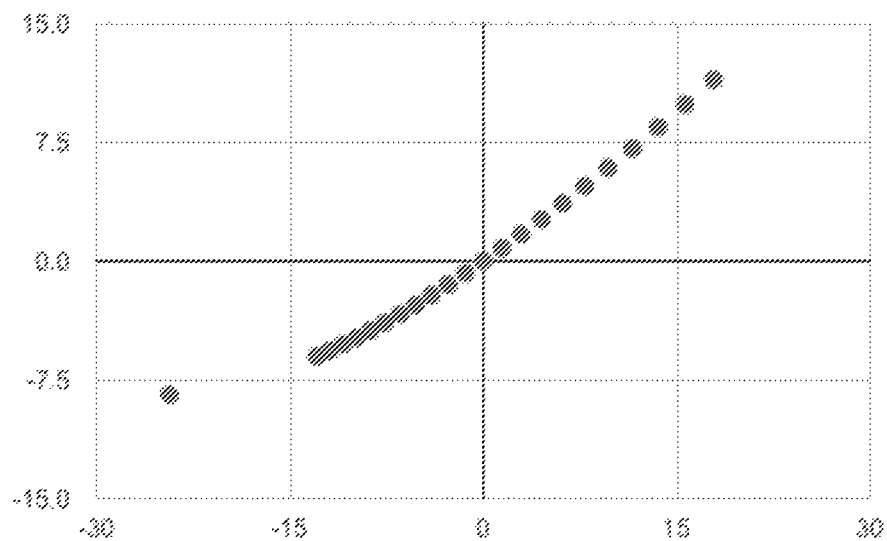
Figure 5C:
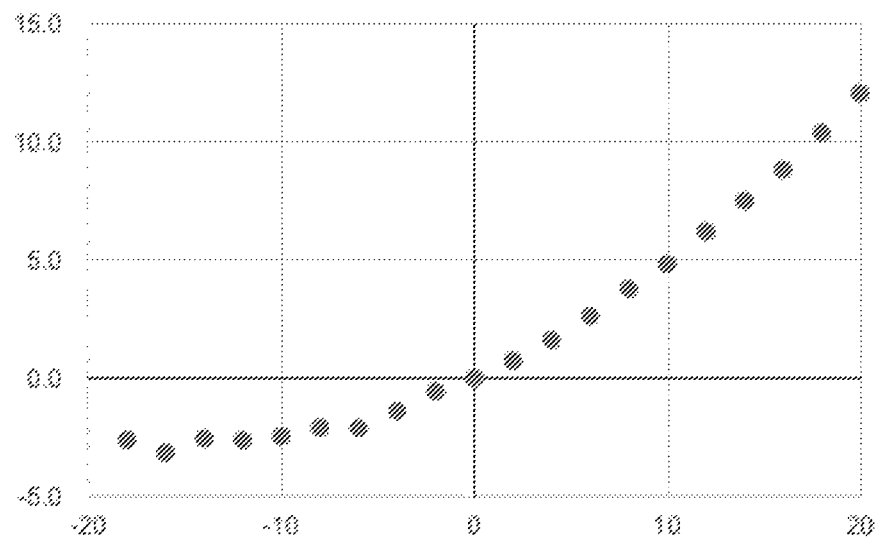

FIGS. 5A-5C illustrate example height process sensitivities relative to a pad having a nominal 500 micron diameter and a solder protuberance having a nominal 300 micron radius. In some embodiments, an optically acceptable variation in the lens height may be plus or minus 10 microns.

In particular, FIG. 5A illustrates a height sensitivity relative to the solder protuberance 106 shape. The x-axis represents a stencil mask opening variation in microns. The y-axis represents a lens component position error in microns. For example, the y-axis may represent the reference height z resulting from solder protuberances 106 resulting from the various stencil mask opening variations shown on the x-axis. The tolerances for laser cut stencil openings may be plus or minus 6 microns. Thus, for example, the lens height variation due to stencil opening variation may be plus or minus 2.5 microns.

FIG. 5B illustrates the height sensitivity relative to the solder volume of the solder protuberance. The x-axis represents a percent difference in solder volume relative to nominal. The y-axis represents a lens component position error in microns. Solder volume variation due to stencil process variation may be greater than minus 10 percent and less than plus 10 percent. Thus, for example, the lens height variation due to variations in solder volume may be plus or minus 4 microns.

FIG. 5C illustrates the height sensitivity relative to the pad radius. The x-axis represents a pad radius variation in microns. The y-axis represents a lens component position error in microns. A variation in pad diameter in an IC substrate process may be plus or minus 5 microns. Thus, for example, the lens height variation due to variations in pad radius may be plus or minus 2.5 microns. By way of comparison, conventional radio frequency PCB etching processes may exhibit a variation of plus or minus 12 microns.

Figure 6A:
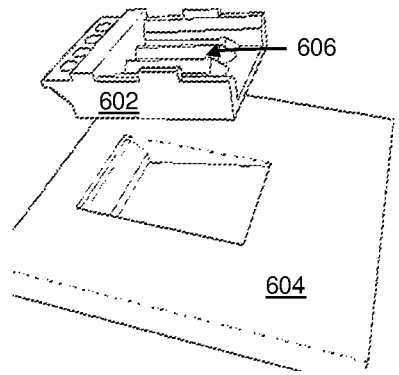
FIGS. 6A-6E illustrate an example assembly process for an optical fiber cable.
Figure 6B:
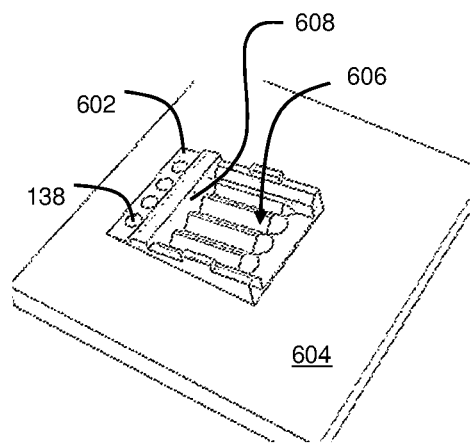

FIGS. 6A-6F illustrate an example optical fiber 120 alignment and assembly process for the cable 121 of FIGS. 1A-1D. As shown in FIGS. 6A and 6B, the process may begin by placing a body 602 of the cable lens component 118 into a holding fixture 604. The body 602 may include alignment grooves 606 and a fiber face stop 608. The body 602 may include the lenses 138, which may be offset from a face of the body 602 such that the lenses 138 may be protected from contact through an assembly process. The lenses 138 may also be accessed and cleaned.

Figure 6C:
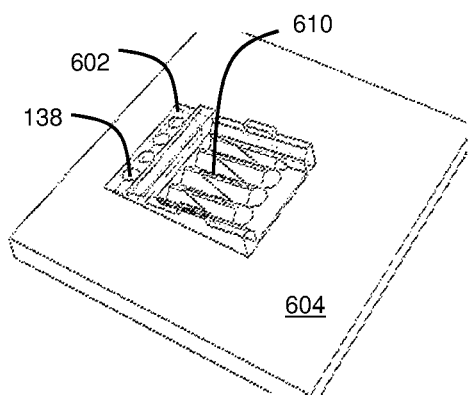
Figure 6D:
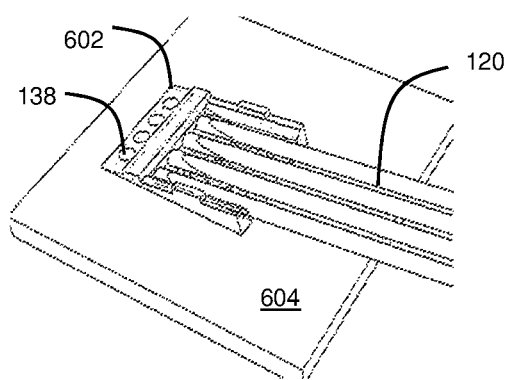
Figure 6E:
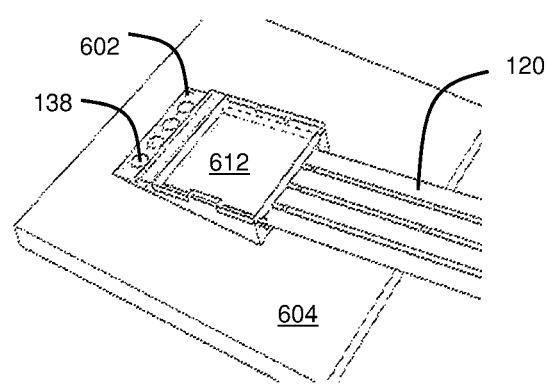

As shown in FIG. 6C, an epoxy 610 may be introduced to a cavity formed in the body 602. As shown in FIG. 6D, optical fibers 120 may be positioned within the alignment grooves 606 and with a face of the optical fibers 120 placed against the fiber face stop 608. As shown in FIG. 6E, a cap 612 may be located on the body 602. The epoxy 610 may be light cured and/or heat cured. Any bubbles in the epoxy 610 may be encouraged to dissipate before the epoxy 610 is cured. Alternately or additionally, the epoxy 610 may be selected to index match the fibers and or the cable lens component 118.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A system comprising:
    a substrate including a plurality of pads and a plurality of solder protuberances, each solder protuberance of the plurality of solder protuberances located on an associated pad of the plurality of pads;
    a lens component defining a groove having a continuous, substantially rectangular shape, the groove sized to receive at least a portion of each solder protuberance of the plurality of solder protuberances, the lens component positioned relative to the substrate such that at least a portion of each solder protuberance of the plurality of solder protuberances is positioned within the groove; and
    epoxy located within the groove.

2. The system of claim 1, wherein the epoxy is configured to shrink during a curing process of the epoxy.

3. The system of claim 1, wherein the lens component further defines an epoxy well and one or more drain holes in fluid communication with the epoxy well and the groove.

4. The system of claim 1, wherein the groove includes an angular groove.

5. The system of claim 4, wherein the angular groove includes a right-angle groove.

6. The system of claim 5, wherein the right-angle groove has a nominal opening width equal to a nominal diameter of the pads of the plurality of pads.

7. The system of claim 1, further comprising:
    a cable lens component configured to be located on the lens component; and
    a plurality of optical fibers at least partially positioned in the cable lens component.

8. The system of claim 7, further comprising a lens clip configured to be removably located on the lens component and to urge the cable lens component against the lens component.

9. The system of claim 7, wherein the lens component includes a protrusion defining an area on which the cable lens component is located.

10. The system of claim 9, wherein the protrusion separates the area on which the cable lens component is located from an epoxy well.

11. The system of claim 7, wherein the cable lens component is configured to be selectively separated into two or more portions.

12. The system of claim 1, wherein the lens component includes molded plastic.

13. The system of claim 1, substrate includes a lithographically formed printed circuit board.

14. The system of claim 1, wherein the pads include circular pads having a nominal diameter of 500 microns.

15. The system of claim 1, wherein each of the solder protuberances of the plurality of solder protuberances has a spherical cap shape having a nominal radius of 300 microns.

16. An optoelectronic transceiver comprising:
    a substrate including a plurality of pads and a plurality of solder protuberances, each solder protuberance of the plurality of solder protuberances located on an associated pad of the plurality of pads;
    a transceiver lens component defining a groove having a continuous, substantially rectangular shape, the groove sized to receive at least a portion of each solder protuberance of the plurality of solder protuberances, the lens component positioned relative to the substrate such that at least a portion of each solder protuberance of the plurality of solder protuberances is positioned within the groove;

epoxy located within the groove;

a fiber optic cable including:
   a cable lens component configured to be located on the transceiver lens component; and
   a plurality of optical fibers at least partially positioned in the cable lens component; and a lens clip configured to be removably located on the transceiver lens component and to urge the cable lens component against the transceiver lens component.

17. The optoelectronic transceiver of claim 16, wherein the transceiver lens component further defines an epoxy well and one or more drain holes in fluid communication with the epoxy well and the groove.

18. The optoelectronic transceiver of claim 16, wherein the groove includes a right-angle groove.

\* \* \* \* \*